United States Patent
Gimblet

(12)
(10) Patent No.: US 6,256,438 B1
(45) Date of Patent: Jul. 3, 2001

(54) FIBER OPTIC DROP CABLE

(75) Inventor: Michael J. Gimblet, Hickory, NC (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/430,604

(22) Filed: Oct. 29, 1999

(51) Int. Cl.$^7$ .................................................. G02B 6/44
(52) U.S. Cl. ...................... 385/109; 385/106; 385/112; 385/107
(58) Field of Search ................... 385/100–114, 135; 523/173; 174/23 R

(56) References Cited

U.S. PATENT DOCUMENTS

| | | | |
|---|---|---|---|
| 3,651,244 | 3/1972 | Silver et al. ................... | 174/36 |
| 4,322,574 | 3/1982 | Bow et al. ..................... | 174/107 |
| 4,832,444 | 5/1989 | Takahashi et al. .............. | 350/96.26 |
| 4,846,573 | 7/1989 | Taylor et al. .................. | 356/241 |
| 4,867,526 | 9/1989 | Arroyo ......................... | 350/96.23 |
| 5,000,533 | 3/1991 | Gerwers ........................ | 350/96.2 |
| 5,039,197 | 8/1991 | Rawlyk ......................... | 385/102 |
| 5,157,752 | 10/1992 | Greveling et al. .............. | 385/112 |
| 5,268,971 | 12/1993 | Nilsson et al. ................ | 385/101 |
| 5,684,904 | 11/1997 | Bringuier et al. .............. | 385/109 |
| 5,778,652 | 7/1998 | Kunze ........................... | 57/235 |
| 5,917,977 | 6/1999 | Barrett ........................ | 385/101 |
| 6,088,499 * | 7/2000 | Newton et al. ................. | 385/112 |

FOREIGN PATENT DOCUMENTS 0 703 478 A1    3/1995   (EP) .

* cited by examiner

*Primary Examiner*—Phan T. H. Palmer
(74) *Attorney, Agent, or Firm*—Timothy J. Aberle

(57) ABSTRACT

A fiber optic cable that includes an armor layer having inner and outer surfaces and defining a passageway therethrough, a protective jacket surrounding the armor layer, a plurality of optical fibers extending lengthwise through the passageway, and a water swellable element for inhibiting water migration through the passageway. The water swellable element can be a water swellable layer on at least one of the inner and outer surfaces of the armor layer and/or a water swellable yarn extending through the passageway. The fiber optic cable is preferably tubeless, i.e., free of buffer tubes. In instances in which a water swellable layer is on the inner surface of the armor layer, the optical fibers are capable of contacting the water swellable layer. Alternatively, in instances in which the fiber optic cable includes water swellable yarns but not a water swellable layer on the inner surface of the armor layer, the optical fibers are capable of contacting the armor layer and, more particularly, the plastic coating of the armor layer. The fiber optic cable can exhibit shape retention whereby the fiber optic cable can retain a bent shape.

25 Claims, 1 Drawing Sheet

FIBER OPTIC DROP CABLE

FIELD OF THE INVENTION

The present invention relates generally to fiber optic cables and, more particularly, to fiber optic cables having water swellable elements for facilitating a dry construction.

BACKGROUND OF THE INVENTION

Fiber optic cables can be employed in a variety of applications including the transmission of voice and data in cable television, computer and telephone systems. Fiber optic cables can generally be classified into two categories, namely, trunk and distribution cables that are designed to span relatively long distances, and drop cables that span much shorter distances and that typically terminate at a home or business. Trunk and distribution cables are generally relatively large and rigid. For example, trunk and distribution cables typically include a relatively thick jacket and large core components protecting the optical fibers. Trunk and distribution cables can include one or more strength members resisting sharp twists or turns of the cable. As a result of their construction, trunk and distribution cables are generally expensive.

In contrast to trunk and distribution cables, fiber optic drop cables are typically relatively flexible. This flexibility facilitates twisting and turning of the drop cable during installation. Since fiber optic drop cables generally include fewer optical fibers and extend across shorter distances than fiber optic trunk and distribution cables, fiber optic drop cables are comparatively smaller and less expensive.

The introduction of water into a fiber optic cable and the migration of water therethrough can be a problem. Fiber optic cables typically define one or more internal passageways through which the optical fibers extend. Water that enters the passageway can migrate in the internal passageway and be conducted to a closure or other termination device. The water can then physically degrade the closure or other termination device and/or can damage electronics mounted within the closure or other termination device. In addition, any water that remains in the passageway defined by the fiber optic cable can disadvantageously subject the optical fibers to additional forces if the water were to freeze.

Several methods have been employed to inhibit the migration of water. For example, fiber optic cables have included a hydrophobic grease or gel that fills the internal passageways. While the hydrophobic grease or gel blocks the migration of moisture through the passageways, the fiber optic cable must be designed and the hydrophobic grease or gel must be selected such that the hydrophobic grease or gel is compatible with the materials that form the other elements of the fiber optic cable with which the hydrophobic grease or gel may contact. A buffer tube can define the internal passageway that is filled with hydrophobic grease or gel, in which case the buffer tube may have to be formed of a more expensive compatible polymer. In addition, fiber optic cables that include a hydrophobic grease or gel are generally more difficult to handle during their manufacture, installation and repair.

Fiber optic cables have also been designed that include elements formed of water swellable material, for a super absorbent polymer. The water swellable material is typically carried by yarns or tapes that are disposed within a passageway in the fiber optic cable. Upon contact with water, the water swellable material will absorb the water and swell so as to physically close the passageway, thereby preventing migration of water through the passageway. See, for example, U.S. Pat. Nos. 5,684,904 and 5,039,197, the contents of both of which are expressly incorporated herein by reference.

While various fiber optic cables have been designed to prevent the introduction of water into and the migration of water through the internal passageways defined by the fiber optic cables, most of these fiber optic cables are relatively large and/or expensive cables that are best suited for use as trunk and distribution cables.

SUMMARY OF THE INVENTION

In view of the foregoing, a fiber optic cable according to one aspect of the present invention comprises an armor layer having inner and outer surfaces and defining a passageway therethrough; a water swellable layer on at least one of the inner and outer surfaces of the armor layer for inhibiting water migration; a protective jacket surrounding the armor layer and the water swellable layer; and at least one optical fiber extending lengthwise through the passageway defined by the armor layer, the optical fiber being capable of contacting at least one of the water swellable layer and the armor layer.

A fiber optic cable according to another aspect of the present invention comprises an armor layer having inner and outer surfaces and defining a passageway therethrough, the armor layer comprising a metallic layer and a plastic coating on at least the inner surface of the metallic layer, the metallic layer being at least twice as thick as the plastic coating; a water swellable element disposed within the passageway defined by the armor layer for absorbing water that enters the passageway; a protective jacket surrounding the armor layer; and at least one optical fiber extending lengthwise through the passageway defined by the armor layer, the optical fiber being capable of contacting the plastic coating on the inner surface of the armor layer.

According to yet another aspect of the present invention, the fiber optic cable comprises a drop cable having an armor layer defining a passageway therethrough; a protective jacket surrounding the armor layer and having an outer diameter of about 6.4 mm; and at least one optical extending lengthwise through the passageway defined by the armor layer, wherein the fiber optic drop cable exhibits shape retention whereby the fiber optic drop cable retains a bent shape once the fiber optic drop cable has been bent. In one embodiment, the fiber optic cable of this aspect of the present invention can also include a water swellable element, such as a water swellable layer on the armor layer and/or at least one water swellable yarn disposed within the passageway.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
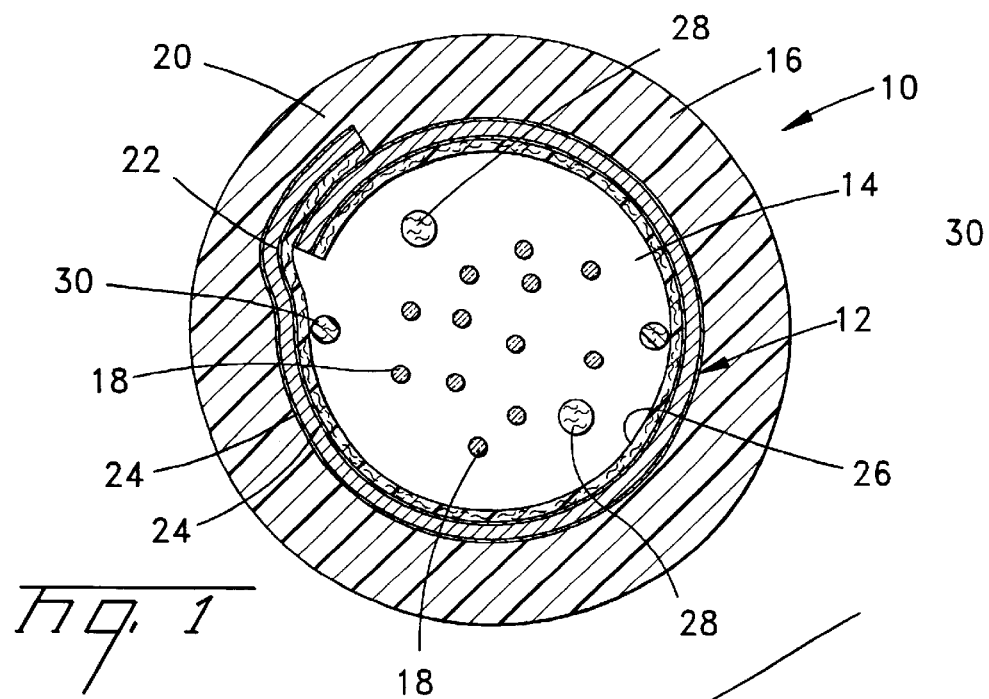
FIG. 1 is a cross-sectional view of a fiber optic cable according to one advantageous embodiment of the present invention.
Figure 2:
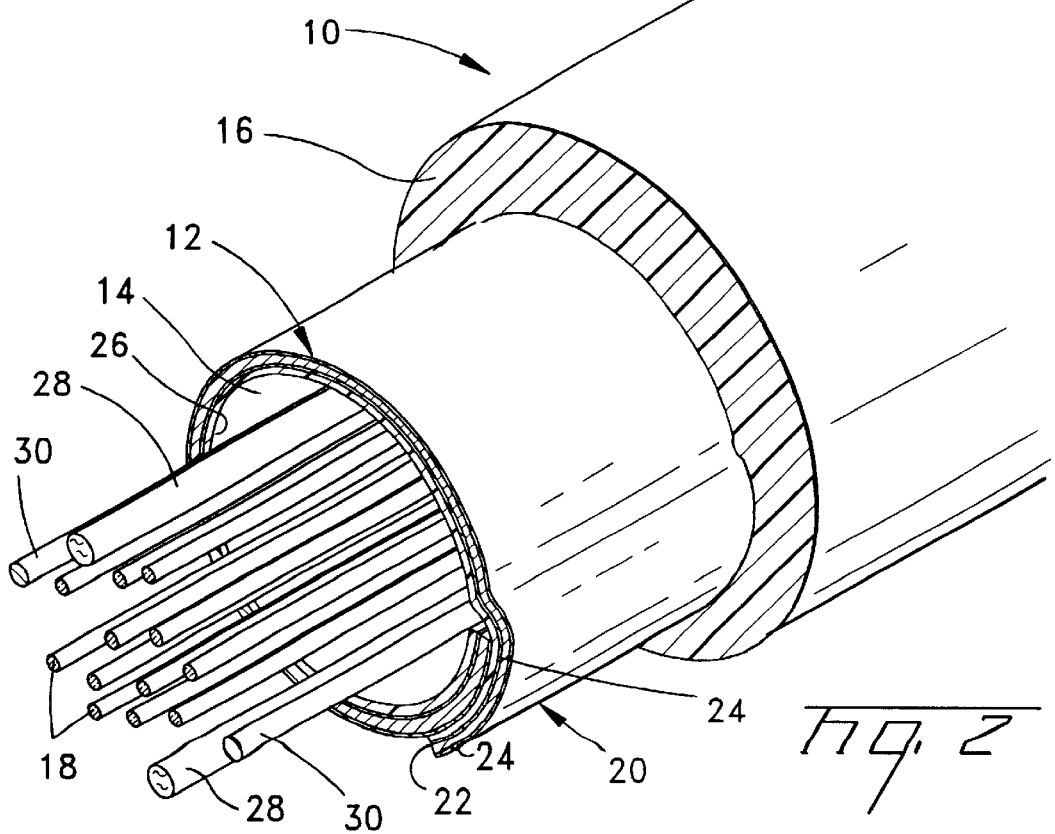
FIG. 2 is a perspective view of the fiber optic cable of FIG. 1.

Referring now to FIGS. 1 and 2, a fiber optic cable 10 according to one advantageous embodiment of the present invention is illustrated. Although fiber optic cable 10 can serve as a trunk and distribution cable, fiber optic cable 10 preferably serves as a drop cable. Fiber optic cable 10 is therefore preferably designed to be relatively small. In this regard, fiber optic cable 10 preferably has a relatively small outer diameter such as between about 6.4 millimeters to about 5.4 millimeters. In one embodiment, for example, fiber optic cable 10 has an outer diameter of about 5.8 millimeters. In addition, fiber optic cable 10 is preferably designed to be relatively flexible to twisting and turning thereof during installation.

In a preferred embodiment, fiber optic cable 10 includes an armor layer 12 that defines a lengthwise extending passageway 14 therethrough. As shown in FIGS. 1 and 2, fiber optic cable 10 also includes a protective jacket 16, typically formed of polyethylene, such as medium density polyethylene, that surrounds armor layer 12. While protective jacket 16 can have various thicknesses, protective jacket 16 typically has a thickness between about 0.7 millimeters and about 1.0 millimeters and, more preferably, about 0.9 millimeters. In addition, fiber optic cable 10 includes at least one and, more preferably, a plurality of single-mode and/or multi-mode optical fibers 18 that extend lengthwise through passageway 14. Optical fibers 18 can be disposed, for example, in bundles or ribbonized form, and can be individually tight buffered, for example, up to about a 900 μm OD or more. In a preferred embodiment, optical fibers 18 are not loosely disposed in buffer tubes. Additionally, optical fibers 18 can be multi-core optical fibers, and preferably fibers 18 have a coloring layer to facilitate fiber identification.

Armor layer 12 is generally fabricated by forming an armor tape into a tubular form, as described in detail below. As such, armor layer 12 generally includes a seam 20 that extends lengthwise therealong. While armor layer can include different types of seams, such as a butt joint, armor layer 12 of fiber optic cable 10 of the illustrated embodiment includes a seam defined by the overlapping edge portions of the armor tape.

Armor layer 12 has an inner surface proximate passageway 14 and an opposed outer surface proximate protective jacket 16 that surrounds armor layer 12. Armor layer 12 includes a metallic layer 22, typically formed of a metal, such as steel, or a metal alloy. Armor layer 12 also preferably includes a plastic coating 24 on at least the inner surface of metallic layer 22. As shown in FIGS. 1 and 2, armor layer 12 most preferably includes plastic coatings on both the inner and outer surfaces of metallic layer 22. While plastic coatings 24 can be formed of various materials, armor layer 12 of one embodiment includes inner and outer plastic coatings formed of ethylene acrylic acid co-polymer (EAA).

Metallic layer 22 is generally significantly thicker than either of plastic coatings 24. In particular, metallic layer 22 is preferably at least twice as thick as either plastic coating. For example, armor layer 12 of one embodiment includes a steel layer 22 having a thickness between about 0.14 millimeters and about 0.17 millimeters and inner and outer plastic coatings that each have a thickness between about 0.045 millimeters and about 0.070 millimeters. Most commonly, metallic layer 22 of this exemplary embodiment has a thickness of about 0.155 millimeters and each plastic coating has a thickness of 0.0575 millimeters.

Fiber optic cable 10 also preferably includes at least one water swellable element. As shown in FIGS. 1 and 2, the water swellable element can be a water swellable layer 26 on at least one of the inner and outer surfaces of armor layer 12 for absorbing water and resisting water migration into and through passageway 14. As also illustrated, however, the water swellable element can be at least one water swellable yarn 28 that is disposed within passageway 14 and extends lengthwise therethrough. Although fiber optic cable 10 of FIGS. 1 and 2 is depicted to include both water swellable layer 26 and water swellable yarns 28, both are not necessarily required. The water swellable element can be formed of various water swellable materials known in the art. For example, the water swellable element may be formed of a super-absorbent polymer as described by U.S. Pat. Nos. 5,039,197 and 5,684,904, the contents of which have been incorporated herein by reference. In one embodiment, super-absorbent polymer in powder form is mixed with a thermoplastic resin to form water swellable layer 26. While various super-absorbent polymers can be employed in this embodiment, the super-absorbent polymers can be derived from sodium or potassium salts of acrylic acid, including commercially available super-absorbent polymers marketed under the trade names Cabloc 80 HS by Stockhausen, Inc. and Adall 1470 and 1460F from Chemdal Corporation. In addition, various types of thermoplastic resin can be employed in this embodiment including, for example, light curable resins.

Fiber optic cable 10 can also include one or more ripcords 30 for facilitating removal of armor layer 12 and protective jacket 16. In this regard, pulling a ripcord in both a radially outward and lengthwise extending direction serves to sever or otherwise separate armor layer 12 and protective jacket 6 in order to expose optical fibers 18.

Fiber optic cable 10 of the present invention is preferably free of buffer tubes, that is, fiber optic cable 10 preferably comprises a tubeless design. In other words, although the fibers can be tight buffered, optical fibers 18 are preferably disposed unbuffered, that is, not disposed in loose tubes, within passageway 14. Since optical fibers 18 are not disposed within a buffer tube, in the embodiment in which fiber optic cable 10 includes water swellable layer 26 on at least one of the inner and outer surfaces of armor layer 12, optical fibers 18 are capable of contacting at least one of water swellable layer 26 and the armor layer 12. In the illustrated embodiment in which water swellable layer 26 is proximate the inner surface of armor layer 12, for example, optical fibers 18 are therefore capable of contacting water swellable layer 26. Moreover, in the embodiment wherein fiber optic cable 10 includes at least one water swellable yarn 28 extending lengthwise through passageway 14, the optical fibers 18 are capable of contacting armor layer 12 and, more particularly, plastic coating 24 on the inner surface of armor layer 12.

In addition to the tubeless embodiment of fiber optic cable 10, another embodiment of fiber optic cable 10 preferably includes no, or but a few, strength members, such as steel wires, glass reinforced plastic members or aramid reinforced plastic members. Fiber optic cable 10 can include strength members that extend between armor layer 12 and protective jacket 16. As is known to those skilled in the art, strength members generally impart the flexibility to a fiber optic cable and prevent the fiber optic cable from being bent excessively.

An embodiment of fiber optic cable 10 can exhibit shape retention. In this regard, fiber optic cable 10 preferably has a shape memory characteristic whereby it retains its shape once it has been bent. In this aspect fiber optic cables 10 are inherently essentially non-flexible, but they can be re-shaped upon application of force. For example, during the course of installing fiber optic cable 10, fiber optic cable 10 may need to be bent, such as about a corner. Since fiber optic cable 10 can retain its shape, it may not need to be tacked to the corner about which the fiber optic cable is bent. The shape retention characteristic of fiber optic cable 10 exists preferably without strength members. Buffer tubes and strength members could otherwise impose spring-like forces tending to cause the fiber optic cable to reassume its nominal, unbent position. Strength members can be selected and included in the cable, however, to provide tensile strength where needed. The strength members can be disposed in a way that imparts a preferential bend characteristic to the cable.

Fiber optic cable 10 of the present invention can be fabricated in various manners. In the illustrated embodiment in which water swellable layer 26 is preformed as a coating upon one surface of the armor tape, the armor tape, optical fibers 18 and ripcords 30, if any, are drawn from respective pay-offs. The armor tape, optical fibers and ripcords are presented to an armor roll forming table that longitudinally wraps the armor tape about optical fibers 18 and ripcords 30. In this embodiment, the armor tape is preferably oriented relative to optical fibers 18 and ripcords 30 such that the armor layer 12 formed by the roll forming table includes water swellable layer 26 on the inner surface facing optical fibers 18. As a result, optical fibers 18 and ripcords 30 extend lengthwise through passageway 14 defined by armor layer 12. Preferably, the roll forming table forms the armor tape into a tubular form with relatively little force and heat generation. As such, the armor tape can preferably be longitudinally wrapped about optical fibers 18 and the ripcords 30 without having to first pass the armor tape through an oil bath in order to reduce the friction that would otherwise be generated as the armor tape is advanced through the roll forming table. Accordingly, water swellable layer 26 need not be exposed to oil that may otherwise adversely affect the water absorption characteristics of the water swellable layer. After the armor tape has been formed into an armor layer that surrounds optical fibers 18 and ripcords 30, armor layer 12, optical fibers 18 and ripcords 30 can be passed through an extruder that extrudes protective jacket 16 around armor layer 12.

In embodiments in which water swellable layer 26 is not preformed on a surface of the armor tape, but is instead provided as a separate water swellable tape, the water swellable tape is also drawn from a respective pay-off in parallel with the armor tape, optical fibers 18 and ripcords 30. Thereafter, the water swellable tape is longitudinally wrapped about optical fibers 18 and ripcords 30 and the armor tape is then wrapped about the water swellable tape, optical fibers 18 and ripcords 30 such that the water swellable tape is again disposed within the resulting armor layer 12. Protective jacket 16 can then be extruded about armor layer 12 in the manner described above.

In embodiments of the fiber optic cable 10 that include at least one water swellable yarn 28, water swellable yarns can be drawn from a respective pay-off in parallel with the armor tape, optical fibers 18 and ripcords 30. The armor tape is then longitudinally wrapped about water swellable yarns 28, optical fibers 18 and ripcords 30 to form armor layer 12 in the same manner as described above. Thereafter, protective jacket 16 can be extruded about armor layer 12 to form fiber optic cable 10. In each of these instances, however, the fabrication of fiber optic cable 10 is simplified relative to conventional fiber optic cable fabrication processes since fiber optic cables 10 of the present invention typically need not include buffer tubes or strength members.

Regardless of the method by which fiber optic cable 10 is manufactured, fiber optic cable 10 of one embodiment of the present invention effectively prevents migration of water through internal passageway 14. In this regard, the water swellable element, such as water swellable layer 26 on armor layer 12 or at least one water swellable yarn 28 disposed within passageway 14, is positioned so as to be exposed to water that could enter the passageway. The water swellable element will then absorb the water and swell so as to effectively inhibit the migration of water through passageway 14. As such, fiber optic cable 10 of this embodiment effectively prevents water from migrating through passageway 14. Additionally, fiber optic cable 10 of one embodiment of the present invention is preferably free of buffer tubes and strength members such that the fabrication of the fiber optic cable is simplified. By not including buffer tubes and strength members, fiber optic cable 10 of this embodiment also exhibits shape retention whereby the fiber optic cable retains its shape once it has been bent. As such, fiber optic cable 10 of this embodiment is particularly suited for applications in which the fiber optic cable is to be twisted and/or turned, such as during the installation of a fiber optic drop cable.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Accordingly, what is claimed is:

1. A fiber optic cable comprising:
   an armor layer having inner and outer surfaces and defining a passageway therethrough;
   a water swellable layer on at least one of the inner and outer surfaces of said armor layer for inhibiting water migration;
   a protective jacket surrounding said armor layer and said water swellable layer; and
   at least one optical fiber extending lengthwise through the passageway defined by said armor layer, said optical fiber being capable of contacting at least one of said water swellable layer and said armor layer.

2. A fiber optic cable according to claim 1 wherein said water swellable layer is disposed on at least the inner surface of said armor layer, and wherein said at least one optical fiber is capable of contacting said water swellable layer.

3. A fiber optic cable according to claim 1 wherein said armor layer comprises a metallic layer and a plastic coating on at least the inner surface of the metallic layer.

4. A fiber optic cable according to claim 3 wherein the metallic layer is at least twice as thick as the plastic coating.

5. A fiber optic cable according to claim 3 wherein said armor layer further comprises a plastic coating on the outer surface of the metallic layer.

6. A fiber optic cable according to claim 1 wherein the fiber optic cable is a fiber optic drop cable in which said protective jacket has an outer diameter of about 6.4 mm.

7. A fiber optic cable according to claim 1 wherein the fiber optic cable is free of both buffer tubes and strength members such that the fiber optic cable exhibits shape retention whereby the fiber optic cable retains its shape once the fiber optic cable has been bent.

8. A fiber optic cable according to claim 1 further comprising at least one water swellable yarn disposed within said passageway.

9. A fiber optic cable according to claim 2 further comprising at least one ripcord for facilitating removal of said armor layer and said protective jacket.

10. A fiber optic cable comprising:
an armor layer having inner and outer surfaces and defining a passageway therethrough, said armor layer comprising a metallic layer and a plastic coating on at least the inner surface of the metallic layer, the metallic layer being at least twice as thick as the plastic coating;
a water swellable element disposed within the passageway defined by said armor layer for absorbing water that enters the passageway;
a protective jacket surrounding said armor layer; and
at least one optical fiber extending lengthwise through the passageway defined by said armor layer, said optical fiber being capable of contacting the plastic coating on the inner surface of said armor layer.

11. A fiber optic cable according to claim 10 wherein said water swellable element comprises at least one water swellable yarn.

12. A fiber optic cable according to claim 10 further comprising at least one ripcord for facilitating removal of said armor layer and said protective jacket.

13. A fiber optic cable according to claim 10 wherein the fiber optic cable is a fiber optic drop cable in which said protective jacket has an outer diameter of no more than about 6.4 mm.

14. A fiber optic cable according to claim 10 wherein the fiber optic cable exhibits shape retention in said armor layer whereby the fiber optic cable retains its shape once the fiber optic cable has been bent.

15. A fiber optic cable according to claim 10 wherein said armor layer further comprises a plastic coating on the outer surface of the metallic layer.

16. A fiber optic drop cable comprising:
an armor layer defining a passageway therethrough;
a protective jacket surrounding said armor layer and having an outer diameter of about 6.4 mm; and
at least one optical fiber extending lengthwise through the passageway defined by said armor layer,
wherein the fiber optic drop cable exhibits shape retention whereby the fiber optic drop cable retains a bent shape once the fiber optic drop cable has been bent.

17. A fiber optic drop cable according to claim 16 further comprising a water swellable element for absorbing water that enters the fiber optic drop cable.

18. A fiber optic drop cable according to claim 17 wherein said armor layer has inner and outer surfaces, and wherein said water swellable element comprises a water swellable layer on at least one of the inner and outer surfaces of said armor layer for inhibiting water migration into the passageway defined by said armor layer.

19. A fiber optic drop cable according to claim 18 wherein said optical fiber is non-buffered such that said optical fiber is capable of contacting said water swellable layer.

20. A fiber optic drop cable according to claim 17 wherein said water swellable element comprises at least one water swellable yarn disposed within the passageway defined by said armor layer for absorbing water that enters the passageway.

21. A fiber optic drop cable according to claim 16 wherein said armor layer comprises a metallic layer having inner and outer surfaces and a plastic coating on at least the inner surface of the metallic layer.

22. A fiber optic drop cable according to claim 21 wherein said optical fiber is non-buffered such that said optical fiber is capable of contacting the plastic coating of said armor layer.

23. A fiber optic drop cable according to claim 21 wherein the metallic layer is at least twice as thick as the plastic coating.

24. A fiber optic drop cable according to claim 21 wherein said armor layer further comprises a plastic coating on the outer surface of the metallic layer.

25. A fiber optic drop cable according to claim 16 further comprising at least one ripcord for facilitating removal of said armor layer and said protective jacket.

* * * * *